May 18, 1937.  C. JACKSON  2,080,921
TOOL FOR WORKING BALLAST AND PLASTIC MATERIALS
Filed June 27, 1936   2 Sheets-Sheet 1
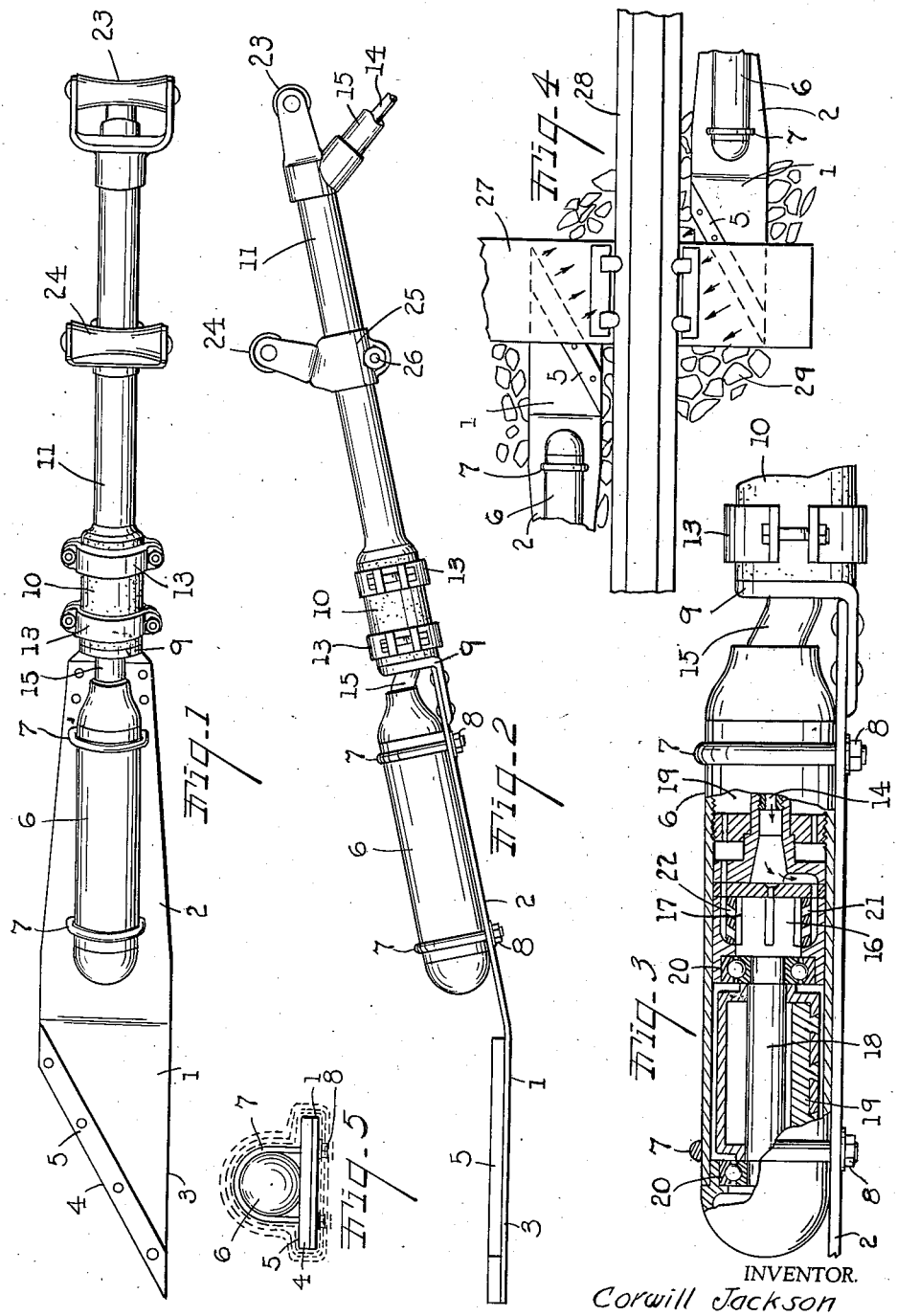
INVENTOR.
Corwill Jackson
BY
Chappell, Earl & Chappell
ATTORNEYS May 18, 1937. C. JACKSON 2,080,921
TOOL FOR WORKING BALLAST AND PLASTIC MATERIALS
Filed June 27, 1936 2 Sheets-Sheet 2
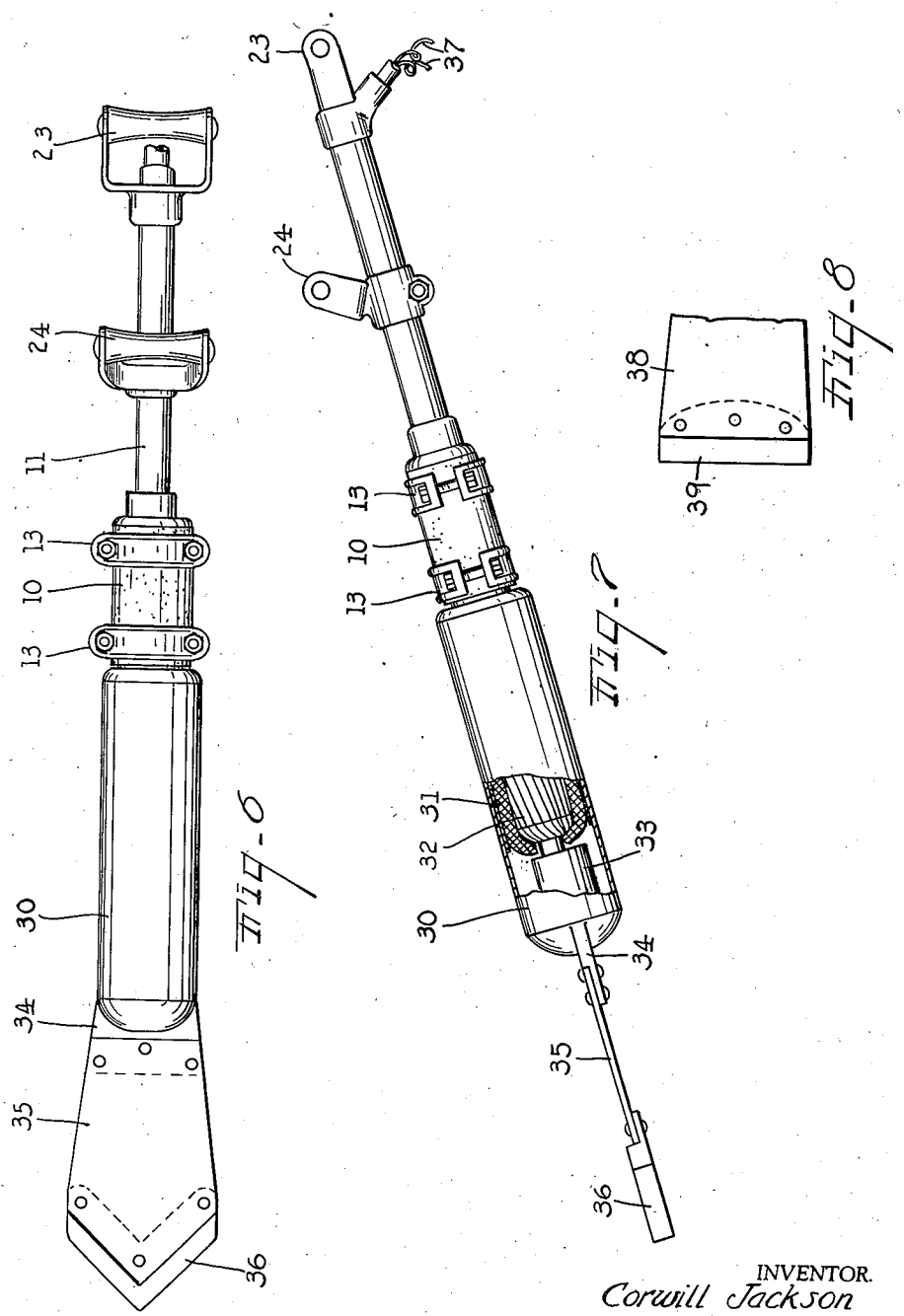
INVENTOR.
Corwill Jackson
BY
ATTORNEYS Patented May 18, 1937

2,080,921

UNITED STATES PATENT OFFICE 2,080,921

TOOL FOR WORKING BALLAST AND PLASTIC MATERIALS

Corwill Jackson, Ludington, Mich.

Application June 27, 1936, Serial No. 87,644

11 Claims. (Cl. 104—14)

This invention relates to improvements in tools for working ballast and plastic materials.

The main objects of this invention are:

First, to provide a tool which is well adapted for the working of ballast, the tamping of ties and also for the placement of concrete and other plastic materials.

Second, to provide a device of the type described which is very compact in form, light in weight, and may be used in quite restricted places.

Third, to provide an implement or tool of the class described having a blade which is well adapted for the working of ballast or concrete under ties, particularly that portion thereof directly under the rails.

Fourth, to provide a structure having these advantages which may be effectively manipulated or used by unskilled workmen.

Objects pertaining to details and economies of my invention will definitely appear from the description to follow. The invention is defined in the claims.

A structure embodying the features of the invention is clearly illustrated in the accompanying drawings, in which:

Fig. 1 is a front view of a tool or implement embodying the features of my invention employing a fluid or hydraulic motor.

Fig. 2 is a side view of the structure shown in Fig. 1, the power supply and return conduits being broken away.

Fig. 3 is an enlarged fragmentary view partially in central longitudinal section.

Fig. 4 is a fragmentary plan view illustrating one use of the tool in the tamping of ballast.

Fig. 5 is an end view illustrating the orbital character of the vibrations of the tool, the vibrations being indicated by dotted lines.

Fig. 6 is a front view of a modified form or embodiment of my invention in which an electric motor is employed.

Fig. 7 is a side view of the structure shown in Fig. 1 partially broken away and partially in longitudinal section.

Fig. 8 is a fragmentary plan view of another type of tool or blade.

In the embodiment of my invention illustrated in Figs. 1–5, inclusive, the blade 1 is provided with a shank 2 preferably integral therewith and joined thereto in an angular relation as is clearly illustrated in Fig. 2. The blade and shank are preferably formed of a flat piece of steel and in this embodiment the blade is tapered, the edge 3 being straight while the edge 4 is inclined. The inclined edge 4 is provided with a nose piece 5.

To the side of the shank 2 I secure a tubular motor housing 6 preferably by means of U-bolts or clips 7 which embrace the housing and are passed through the shank to receive the nuts 8. At its upper end the shank is provided with an arm 9 having a nipple, not illustrated, receiving one end of the tubular resilient coupling member 10. The other end of this coupling member engages a nipple, not illustrated, on the tubular handle 11. Clamps 13 secure this coupling member to the arm 9 and to the tubular handle 11. The tubular handle and the coupling serve as conduit housings for the power supply and return connections indicated at 14 and 15, Fig. 2.

The motor in this embodiment, designated generally by the numeral 16, is a hydraulic motor, its rotor 17 being provided with a shaft 18 having an unbalancing weight 19 thereon. The rotor and shaft are supported by suitable bearings 20 in the motor housing so that the vibrations of this unbalanced shaft or rotor are imparted through the housing to the shank to which it is bolted, and through it to the tool or blade. The supply of fluid to the motor enters through the conduit 14 through suitable passages to the inlet ports 21, and it is discharged through the exhaust ports 22 and suitable passages provided therefor to the return or exhaust conduit 15.

The handle is provided at its end with a D grip 23 and at one side with a D grip 24, the grip 24 being carried by a clip 25 which is adjustable longitudinally of the handle, the clamping bolt for the clip or clamp 25 being indicated at 26. This enables the adjustment of the handle 24 to suit the convenience of the particular user. The flexible coupling 10 minimizes the vibration and shock on the operator.

The unbalanced rotor tends to set up vibrations in an orbital path, the axis of which is longitudinal of the blade. This vibratory movement I have indicated by dotted lines in Fig. 5.

The tool or implement shown in Figs. 1–5 is especially adapted for the tamping and placement of ballast, a tie of a railway track being indicated at 27 and a rail at 28. The ballast is indicated at 29.

The placement of ballast by the use of vibratory tampers such, for example, as shown by my Patent No. 1,779,474, issued October 1, 1930, has been largely practiced but the machine of this application is compact and is well balanced, and can be effectively manipulated for the placing of ballast under the ties beneath the rail, as is indicated in Fig. 4. This insures an effective tamping or compacting of the ballast directly under the rail with a minimum of effort and care on the part of the operator. Further, the tool can be readily positioned to bring the blade to a horizontal position with a minimum of effort on the part of the operator.

In the embodiment of my invention shown in Figs. 6 and 7 the motor housing 30 is designed to receive an electric motor 31, the rotor 32 of which is provided with an unbalancing weight 33. At its lower end the motor housing is provided with a tang or support 34 shouldered to receive the blade 35 which is provided with a tapered or pointed nose piece 36. In this case the handle and the coupling serve as a housing conduit for the circuit wires 37. The handle, the axis of the rotor and the blade are in alinement.

In the embodiment shown in Fig. 8, the blade 38 has a substantially straight tip 39, this being a type of blade adapted for certain uses.

While the tools illustrated are primarily designed by me for use in the placement of crushed rock ballast as illustrated, they are well adapted for the placement of concrete or other plastic materials, working it beneath some object, as a beam, or compacting it or otherwise treating the concrete to secure effective placement thereof and to facilitate its placement.

I have illustrated and described embodiments of my invention which I have found very practical. I have not attempted to illustrate or describe other adaptations and modifications which I contemplate as it is believed that this disclosure will enable the adaptation of my invention as may be desired.

Having thus described my invention what I claim as new and desire to secure by Letters Patent is:

1. In a tool of the class described, the combination of a plate-like tapered blade straight on one edge and inclined on the opposite edge and having a nose piece on its inclined edge, said blade being provided with an integral shank disposed at an angle thereto, a tubular motor housing secured to the upper side of said shank by means of clips embracing said housing, a hydraulic motor mounted within said housing and provided with a rotor having an unbalancing weight, the axis of the rotor being parallel to the longitudinal plane of the shank, a tubular handle, and a tubular flexible coupling for said handle to said shank, said handle and flexible coupling constituting a housing for the power supply connections for the motor.

2. In a tool of the class described, the combination of a blade provided with a shank, a tubular motor housing secured to said shank, a hydraulic motor mounted within said housing and provided with a rotor having an unbalancing weight, the axis of the rotor being parallel to the longitudinal plane of the shank, a tubular handle, and a tubular flexible coupling for said handle to said shank, said handle and flexible coupling constituting a housing for the power supply connections for the motor.

3. In a tool of the class described, the combination of a plate-like tapered blade straight on one edge and inclined on the opposite edge and having a nose piece on its inclined edge, said blade being provided with an integral shank disposed at an angle thereto, a tubular motor housing secured to the upper side of said shank by means of clips embracing said housing, a motor within said housing and provided with a rotor having an unbalancing weight, the axis of the rotor being parallel to the shank, a handle, and a flexible coupling for said handle to said shank.

4. In a tool of the class described, the combination of a blade provided with a shank, a motor housing secured to the upper side of said shank, a motor within said housing and provided with a rotor having an unbalancing weight, the axis of the rotor being parallel to the shank, a handle, and a flexible coupling for said handle to said shank.

5. In a tool of the class described, the combination of a blade provided with a shank, a motor housing secured to the upper side of said shank, a motor within said housing and provided with a rotor having an unbalancing weight, the axis of the rotor being parallel to the shank, a handle, and a flexible coupling for said handle to said shank, said handle being provided with a grip disposed at the end thereof and with a second grip disposed on the upper side thereof in spaced relation to the grip at the end of the handle.

6. In a tool of the class described, the combination of a blade provided with a shank, a motor housing secured to said shank, a hydraulic motor mounted within said housing and provided with a rotor having an unbalancing weight, the axis of the rotor being disposed in parallel relation to the shank, a tubular handle, and a tubular flexible coupling for said handle to said shank, said handle and flexible coupling constituting a housing for the power supply connections for the motor.

7. In a tool of the class described, the combination of a blade provided with a shank, a motor housing secured to the said shank, a motor mounted within said housing and provided with a rotor having an unbalancing weight, the axis of the rotor being disposed in parallel relation to the shank, and a handle disposed axially relative to said motor.

8. In a tool of the class described, the combination of a blade, a motor housing secured to said blade, a motor within said housing comprising a rotor provided with an unbalancing weight disposed with the axis of its unbalancing weight in parallel relation to the shank, and a handle connected to said shank.

9. In a tool of the class described, the combination with a tubular motor housing provided with a tang at its lower end, a resilient blade secured to said tang on said motor housing, a motor within said housing provided with an unbalancing weight, and a handle connected to said housing by means of a flexible coupling, said handle, the axis of said motor and said blade being in alined relation.

10. In a tool of the class described, the combination with a motor provided with a tubular housing and with a rotor having an unbalancing weight, a tool secured to one end of said motor housing, and a handle secured to the other end with the handle, tool and axis of the rotor in parallel relation.

11. In a tool of the class described, the combination of a tool, a motor housing to which said tool is secured provided with a rotor having an unbalancing weight, the axis of the rotor being disposed in axial relation to the tool, and a handle disposed in parallel relation to the axis of the rotor.

CORWILL JACKSON.